United States Patent

Johnson et al.

(10) Patent No.: US 8,119,276 B2
(45) Date of Patent: Feb. 21, 2012

(54) IN PARALLEL HYBRID POWER SOURCE COMPRISING A LITHIUM/OXYHALIDE ELECTROCHEMICAL CELL COUPLED WITH A LITHIUM ION CELL

(75) Inventors: Arden P. Johnson, Arlington, MA (US); Konstantin Tikhonov, Winchester, MA (US); Douglas Woodnorth, Needham, MA (US); Jon J. Carroll, Attleboro, MA (US)

(73) Assignee: Electrochem Solutions, Inc., Clarence, NY (US)

( * ) Notice: Subject to any disclaimer, the term of this patent is extended or adjusted under 35 U.S.C. 154(b) by 304 days.

(21) Appl. No.: 12/409,866

(22) Filed: Mar. 24, 2009

(65) Prior Publication Data

US 2009/0246561 A1  Oct. 1, 2009

Related U.S. Application Data

(60) Provisional application No. 61/039,152, filed on Mar. 25, 2008.

(51) Int. Cl.
  *H01M 6/42* (2006.01)
  *H01M 4/13* (2010.01)
  *H01M 6/18* (2006.01)
  *H01M 6/16* (2006.01)
  *H02J 7/00* (2006.01)

(52) U.S. Cl. ........ 429/160; 429/217; 429/221; 429/223; 429/224; 429/218.1; 429/231.8; 429/231.95; 429/319; 429/325; 429/338; 429/344; 429/345; 320/126

(58) Field of Classification Search ............... 429/319, 429/325, 188, 338, 345, 231.8, 223, 224, 429/221, 344, 199, 231.95, 149, 150, 156, 160, 231.9, 218.1, 217; 320/117, 119, 126

See application file for complete search history.

(56) References Cited

U.S. PATENT DOCUMENTS

| | | | |
|---|---|---|---|
| 5,435,874 A | 7/1995 | Takeuchi et al. | |
| 5,674,248 A | 10/1997 | Kroll et al. | |
| 5,998,052 A * | 12/1999 | Yamin | 429/9 |
| 6,656,635 B2 * | 12/2003 | Okawa et al. | 429/221 |
| 6,737,191 B2 | 5/2004 | Gan et al. | |
| 6,746,804 B2 | 6/2004 | Gan et al. | |
| 6,780,542 B2 | 8/2004 | Spillman et al. | |
| 6,909,915 B2 * | 6/2005 | Greatbatch et al. | 607/5 |
| 2007/0143989 A1 | 6/2007 | Polsonetti et al. | |

FOREIGN PATENT DOCUMENTS

| WO | 9928982 | 6/1999 |
|---|---|---|
| WO | 03035175 A1 | 5/2003 |

OTHER PUBLICATIONS

European Search Report., Application No. 09156223.1-2119, Jul. 24, 2009.

* cited by examiner

*Primary Examiner* — Ula C. Ruddock
*Assistant Examiner* — Thomas H. Parsons
(74) *Attorney, Agent, or Firm* — Michael F. Scalise

(57) ABSTRACT

A lithium oxyhalide cell electrically connected in parallel with a lithium ion cell is described. Importantly, the open circuit voltage of the freshly built primary lithium oxyhalide cell is equal to or less that the open circuit voltage of the lithium ion cell in a fully charged state. This provides a power system that combines the high capacity of the primary cell with the high pulse power of the secondary cell. This hybrid power system exhibits increased rate capability, higher capacity and improved safety in addition to elimination of voltage delay in comparison to a comparable lithium oxyhalide cell discharge alone.

24 Claims, 3 Drawing Sheets

IN PARALLEL HYBRID POWER SOURCE COMPRISING A LITHIUM/OXYHALIDE ELECTROCHEMICAL CELL COUPLED WITH A LITHIUM ION CELL

CROSS-REFERENCE TO RELATED APPLICATION

This application claims priority from provisional application Ser. No. 61/039,152, filed Mar. 25, 2008.

BACKGROUND OF THE INVENTION

1. Field of the Invention

The present invention generally relates to the art of electrochemical cells and, more particularly, to a lithium-containing cell system preferably comprising a primary lithium electrochemical cell electrically connected in parallel to a secondary electrochemical cell. A most preferred couple comprises a lithium oxyhalide cell electrically connected in parallel with a lithium ion cell.

2. Prior Art

Primary lithium oxyhalide cells are used extensively in applications requiring high gravimetric and volumetric energy density. Among the many sizes and chemistries available, cells can be developed for low rate or high rate applications and to operate from temperatures as low as −70° C. to as high as 200° C. The anode material usually consists of lithium or lithium alloyed with various elements such as aluminum, magnesium or boron and the cathode usually consists of some form of carbon which is held together using a suitable binder. The electrolyte generally consists of a solvent system of thionyl chloride, phosphoryl chloride or sulfuryl chloride. Often, additional compounds or interhalogen compounds such as sulfur dioxide, chlorine, bromine, bromine chloride and others may be dissolved therein to modify the cell for a particular purpose, such as extending the operating rate or temperature of the cell.

Electrolyte salts are also added to the solvent system to assist in ionic transfer during cell discharge. Such salts may include lithium chloride in combination with aluminum trichloride or gallium trichloride. Lithium tetrachloroaluminate salt (LAC) or lithium tetrachlorogallate salt (LGC) is then formed in-situ. Typically used catholytes include chlorinated sulfuryl chloride (CSC) having either LAC or LGC dissolved therein. These systems are commonly referred to as LAC/CSC and LGC/CSC. Another commonly used catholyte is thionyl chloride ($SOCl_2$) having either LAC or LGC dissolved therein. Electrochemical systems based on this catholyte include $LAC/SOCl_2$ and $LGC/SOCl_2$. According to the present invention, the most preferred catholyte is thionyl chloride-bromine chloride (BCX) having either LAC or LGC dissolved therein.

While lithium oxyhalide cells are well known for their high energy and power density, there are some drawbacks to their use in particular applications. Unlike other pulse dischargeable lithium primary cells containing solid cathode systems and organic-based electrolytes, such as a lithium/silver vanadium oxide cell (Li/SVO) or a lithium/manganese dioxide cell ($Li/MnO_2$), lithium oxyhalide cells have inferior rate capability. Additionally, when lithium oxyhalide cells are used after prolonged storage, their rate capability can be further limited by passivation. Passivation build-up at the anode/electrolyte surface layer is directly related to increased voltage delay when the cell is called upon to deliver a high power pulse.

According to the present invention, this relatively inferior rate capability characteristic of a lithium oxyhalide cell can be overcome to a great extent by electrically connecting the oxyhalide cell in parallel with a lithium ion, rechargeable cell. Importantly, the open circuit voltage of the lithium ion cell in a fully charged state is from about 0.05 volts to about 0.8 volts less than the open circuit voltage of the freshly built first primary cell. The thusly configured hybrid power source has both a high specific energy and a much improved capability for delivering high power pulses, even after long periods of storage.

U.S. Pat. No. 5,998,052 to Yamin describes some of the aspects of such a hybrid power source, but is specifically limited to a system in which "the open circuit voltage of said primary electrochemical cell is lower than the open circuit voltage of said rechargeable cell when said rechargeable cell is not connected to said primary cell and is fully charged." Because the rechargeable cell in this prior art system is only partially charged, the specific energy of the overall system is lower than is desirable.

Therefore, the present invention improves upon the prior art hybrid power system by providing a primary cell electrically connected in parallel to a rechargeable cell. Importantly, the open circuit voltage of the fully charged lithium ion cell is equal to or less than the open circuit voltage of the primary cell. However, the difference is not so great as to cause failure or discharge capacity degradation of the secondary cell. The preferred primary cell is of lithium oxyhalide chemistries.

SUMMARY OF THE INVENTION

In the preferred oxyhalide chemistry, the present invention provides an electrochemical cell of high energy density including a lithium metal anode or an alloy thereof, a cathode current collector of electrically conductive and/or electroactive material and an tonically conductive catholyte solution operatively associated with the anode and the cathode current collector. The preferred electrically conductive material of the cathode comprises a carbonaceous material. The catholyte consists essentially of a first depolarizer component selected from the group consisting of free halogens, interhalogens and mixtures thereof dissolved in a second depolarizer component in the form of a nonaqueous solvent or a mixture of nonaqueous solvents.

The preferred secondary cell is capable of shuttling lithium between the anode and cathode electrodes through hundreds of cycles with very little capacity fade. These cells, typically referred to as lithium ion cells, have a negative electrode of a carbonaceous anode material and a positive electrode of a porous cathode active material composed of a lithiated metal oxide or a lithiated metal phosphate. Cells of this type are widely available commercially and are typically rated up to a 2C constant current discharge or higher.

According to the present invention, the lithium oxyhalide cell is electrically connected in parallel to the lithium ion cell. An important aspect of this couple is that the open circuit voltage of the freshly built primary lithium oxyhalide cell is equal to or greater than the open circuit voltage of the lithium ion cell in a fully charged state. This provides a power system that combines the high capacity of the primary cell with the high pulse power of the secondary cell.

The foregoing and additional advantages and characterizing features of the present invention will become clearly apparent upon a reading of the ensuing detailed description taken in conjunction with the accompanying drawings.

DETAILED DESCRIPTION OF THE PREFERRED EMBODIMENTS

Figure 1:
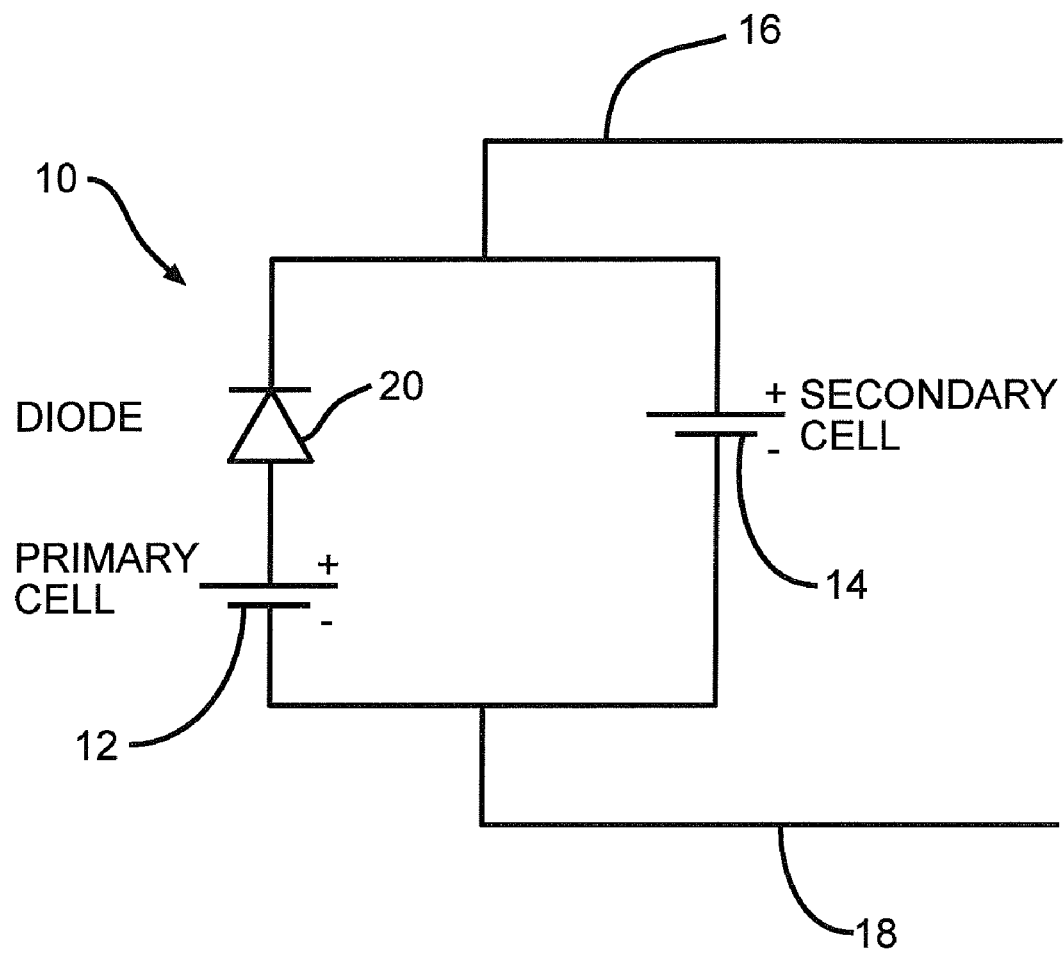
FIG. 1 is schematic of an exemplary power system 10 according to the present invention comprising a primary lithium cell 12 electrically connected in parallel with a lithium ion secondary cell 14.

In this specification, the term "pulse" means a short burst of electrical current of significantly greater amplitude than that of a pre-pulse current immediately prior to the pulse. A pulse train consists of at least one pulse of electrical current. If the pulse train consists of more than one pulse, they are delivered in relatively short succession with or without open circuit rest between the pulses.

In a primary cell of oxyhalide chemistry, the preferred anode active material comprises lithium or a lithium alloy such as a lithium-aluminum alloy. Other suitable alloys include, for example, Li—Mg, Li—Si, Li—B, Li—Al—Mg and Li—Si—B alloys and intermetallic compounds. However, the greater the quantities of the secondary material by weight, in the alloy, the lower the energy density of the cell.

The form of the anode may vary. Preferably the anode is a thin metal sheet or foil of the anode metal, pressed or rolled on a metallic anode current collector, i.e., preferably comprising nickel, to form an anode component. The anode component has an extended tab or lead of the same material as the anode current collector, i.e., preferably nickel, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

In the case of oxyhalide chemistries, the cell comprises a cathode current collector of electrically conductive material supported on a conductive substrate. An oxyhalide cell operates in the following manner. When the ionically conductive catholyte solution becomes operatively associated with the anode and the cathode current collector, an electrical potential difference develops between terminals operatively connected to the anode and cathode current collector. The electrochemical reaction at the anode includes oxidation to form metal ions during cell discharge. The electrochemical reaction at the cathode current collector involves conversion. of those ions which migrate from the anode to the cathode current collector into atomic or molecular forms. In addition, the halogen and/or interhalogen of the catholyte is believed to undergo a reaction or reactions with the nonaqueous solvent thereof resulting in the formation of a compound or complex which exhibits the observed. open circuit voltage of the cell.

Exemplary electrically conductive materials for the cathode current collector include graphite, coke, acetylene black, carbon black, glassy carbon, pitch carbon, synthetic carbon, mesocarbon microbeads (MCMB), carbon monofluoride, and mixtures thereof, bonded on metal screens. Graphite is particularly preferred due to its relatively high lithium-retention capacity. A preferred form of graphite is characterized by irregularly shaped particles which are commercially available from Nippon Carbon Co., Ltd. in Yokohama, Japan. The carbon may be contacted to a conductive substrate in the form of a metal screen such as by pressing, spreading, bonding, and the like.

A typical cathode current collector is fabricated by mixing about 80 to 95 weight percent of at least one of the above listed electrically conductive materials with about 1 to 10 weight percent of a powdered conductive diluent and about 1 to 10 weight percent of a binder material, preferably a thermoplastic polymeric binder material. The term thermoplastic polymeric binder material is used in its broad sense and any polymeric material, preferably in a powdered form, which is inert in the cell and which passes through a thermoplastic state, whether or not it finally sets or cures, is included within the meaning "thermoplastic polymer". Representative materials include polyethylene, polypropylene and fluoropolymers such as fluorinated ethylene and propylene, polyvinylidene fluoride (PVDF), polyethylenetetrafluoroethylene (ETFE), and polytetrafluoroethylene (PTFE), the latter material being most preferred. Natural rubbers are also useful as the binder material with the present invention.

Suitable conductive diluents include acetylene black, carbon black and/or graphite. A preferred carbonaceous diluent is KETJENBLACK® carbon. Metals such as nickel, aluminum, titanium and stainless steel in powder form are also useful as conductive diluents when mixed with the above listed conductive materials.

This mixture is then rolled onto a conductive substrate such as a nickel, stainless steel, or copper foil or screen.

Other cathode active materials useful for constructing a primary electrochemical cell, but one that is not of an oxyhalide chemistry, are selected from fluorinated carbon, a metal, a metal oxide, a metal sulfide or a mixed metal oxide. Such electrode active materials include silver vanadium oxide, copper silver vanadium oxide, manganese dioxide, titanium disulfide, copper oxide, copper sulfide, iron sulfide, iron disulfide, cobalt oxide, nickel oxide, copper vanadium oxide, and other materials typically used in lithium electrochemical cells. Suitable fluorinated carbons are represented by the formula $(CF_x)_n$ wherein x varies between about 0.1 to 1.9 and preferably between about 0.5 and 1.2 and $(C_2F)_n$ and wherein the n refers to the number of monomer units, which can vary widely. These electrode active materials are composed of carbon and fluorine, and include graphitic and nongraphitic forms of carbon, such as coke, charcoal or activated carbon. Primary lithium couples fabricated with the above cathode active materials include, but are not limited to, lithium/carbon monofluoride ($Li/CF_x$), lithium/manganese dioxide, lithium/sulfur dioxide, lithium/silver vanadium oxide (Li/SVO) and even of lithium/iodine ($Li/I_2$) chemistries.

The hybrid power system of the present invention further includes a secondary or rechargeable cell of lithium ion chemistries. The lithium ion cell comprises a negative electrode composed of coke, carbon black, graphite, acetylene black, carbon fibers, glassy carbon, mesocarbon microbeads, and mixtures thereof. Other suitable anode materials for the lithium ion cell include lithium titanate, tin, tin oxides, silicon, and other materials that have a voltage vs. lithium metal that is $\geqq 0.0$ volts when the electrode is fully charged.

The positive electrode is of a lithiated material that is stable in air and readily handled. Examples of such air-stable lithiated cathode materials include oxides, phosphates, sulfides, selenides, and tellurides of such metals as vanadium, titanium, chromium, copper, molybdenum, niobium, iron, nickel, cobalt, and manganese. The more preferred oxides include $LiNiO_2$, $LiMn_2O_4$, $LiCoO_2$, $LiCu_{0.92}Sn_{0.08}O_2$, $LiCo_{1-x}Ni_xO_2$, $LiNi_xCo_yMn_zO_2$, $LiNi_{1-x}Al_xO_2$, and $LiMn_{1-x}Al_xO_2$. The more preferred phosphates include $LiFePO_4$.

To discharge such secondary cells, the lithium metal comprising the positive electrode is intercalated into a carbonaceous negative electrode or anode by applying an externally generated electrical potential to recharge the cell. The applied recharging electrical potential serves to draw lithium from the cathode material, through the electrolyte and into the carbonaceous anode to saturate the carbon comprising the anode. The cell is then provided with an electrical potential and is discharged in a normal manner.

An alternate secondary cell construction comprises intercalating the carbonaceous material with lithium before the negative electrode is incorporated into the cell. In this case, the positive electrode body can be solid and comprise, but not be limited to, such materials as manganese dioxide, silver vanadium oxide, titanium disulfide, copper oxide, copper sulfide, iron sulfide, iron disulfide, and fluorinated carbon. However, this approach is compromised by problems associated with handling lithiated carbon outside the cell. Lithiated carbon tends to react when contacted by air or water.

The positive electrode for the above described primary or secondary cells is prepared in a similar manner as previously described with respect to fabrication of the cathode current collector for an oxyhalide cell. In that respect, the positive electrode is prepared by mixing about 80 to 99 weight percent of an already prepared electrode active material in a finely divided form with about 1 to 10 weight percent of a powdered conductive diluent and about 1 to 10 weight percent of a binder material. Suitable conductive diluents and binder materials have already been described.

Similarly, if the active material is a carbonaceous counter electrode in a secondary cell, the electrode material preferably includes a conductive diluent and a binder material in a similar manner as the previously described primary, solid cathode electrochemical cell.

The thusly prepared active admixture may be formed into a free-standing sheet prior to being contacted to a current collector to form the positive electrode. The manner in which the active admixture is prepared into a free-standing sheet is thoroughly described in U.S. Pat. No. 5,435,874 to Takeuchi et al. Alternatively, the active material mixture can be contacted to the current collector in a manner as described in U.S. Patent Application Pub. No. 2007/0143989 to Polsonetti et al. Both of these applications are assigned to the assignee of the present and incorporated herein by reference. Further, electrode components for incorporation into a cell according to the present invention may also be prepared by rolling, spreading or pressing the active admixture onto the current collector.

Electrodes prepared as described above are flexible and may be in the form of one or more plates operatively associated with at least one or more plates of a counter electrode material, or in the form of a strip wound with a corresponding strip of counter electrode material in a structure similar to a "jellyroll".

For oxyhalide chemistries, the cell further comprises a nonaqueous, ionically conductive catholyte operatively associated with the anode and the cathode current collector. In a cell chemistry having a solid positive electrode, the anode and cathode electrodes are activated with an ionically conductive electrolyte. In either case, the catholyte and the electrolyte serve as a medium for migration. of ions between the anode and the cathode current collector in the case of the oxyhalide chemistry and between the anode and the cathode in the solid positive electrode chemistry during the cell's electrochemical reactions.

For an oxyhalide cell, suitable nonaqueous solvent depolarizers exhibit those physical properties necessary for ionic transport, namely, low viscosity, low surface tension and wettability. In the case of a catholyte, suitable nonaqueous depolarizers are comprised of an inorganic salt dissolved in a nonaqueous co-depolarizer system and, more preferably, a lithium salt dissolved in a catholyte solution comprising a halogen and/or interhalogen dissolved in a nonaqueous solvent. The halogen and/or interhalogen serves as a soluble depolarizer. They can also serve as a co-solvent in the electrochemical cell. The halogen is selected from the group of iodine, bromine, chlorine or fluorine while the interhalogen is selected from the group of $ClF$, $ClF_3$, $ICl$, $ICl_3$, $IBr$, $IF_3$, $IF_5$, $BrCl$, $BrF$, $BrF_3$, $BrF_5$, and mixtures thereof. The mole ratio of any one of the above-referenced halogens and/or interhalogens dissolved in any one of the above-referenced nonaqueous organic or inorganic solvents is from about 1:6 to about 1:1.

The nonaqueous solvent depolarizer may be one of the organic solvents which is substantially inert to the anode and cathode current collector materials such as tetrahydrofuran, propylene carbonate, acetonitrile, dimethyl sulfoxide, dimethyl foramide, dimethyl acetamide and in particular halogenated organic solvents such as 1,1,1,2,3,3,3-heptachloropropane or 1,4-difluorooctachlorobutane. The nonaqueous solvent depolarizer also may be one or a mixture of more than one of the inorganic solvents which can serve as both a solvent and a depolarizer such as thionyl chloride, sulfuryl chloride, selenium oxychloride, chromyl chloride, phosphoryl chloride, phosphorous sulfur trichloride, and others.

The ionic conductivity of the nonaqueous catholyte solution is preferably facilitated by dissolving a lithium salt in the nonaqueous depolarizer. Exemplary salts are lithium halides such as $LiCl$ and $LiBr$ and those of the $LiMX_n$ type, such as $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, $LiSCN$, $LiO_3SCF_2CF_3$, $LiC_6F_5SO_3$, $LiO_2$, $LiO_2CCF_3$, $LiSO_3F$, $LiB(C_6H_5)_4$, $LiCF_3SO_3$, and mixtures thereof. Suitable salt concentrations typically range between about 0.25 to about 1.5 molar.

Thus, the solution of halogen and/or interhalogens, the nonaqueous solvent depolarizer and, optionally, the ionic salt, serve as the co-depolarizer and catholyte of the oxyhalide cell.

In electrochemical systems of either a primary or a secondary chemistry having a solid cathode or solid positive electrode, the nonaqueous solvent system comprises low viscosity solvents including tetrahydrofuran (THF), methyl acetate (MA), diglyme, triglyme, tetragylme, dimethyl carbonate (DMC), ethylmethyl carbonate (EMC), 1,2-dimethoxyethane (DME), diisopropylether, 1,2-diethoxyethane, 1-ethoxy, 2-methoxyethane, dipropyl carbonate, ethyl methyl carbonate, methyl propyl carbonate, ethyl propyl carbonate, diethyl carbonate, and mixtures thereof. While not necessary, the electrolyte also preferably includes a high permittivity solvent selected from cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-butyrolactone (GBL), γ-valerolactone, N-methyl-pyrrolidinone (NMP), and mixtures thereof. Nonaqueous solvent systems also include at least one of the previously described lithium salts in a concentration of about 0.8 to about 1.5 molar.

For a solid cathode primary or secondary cell having lithium as the anode active material, such as of the Li/SVO couple, the preferred electrolyte is $LiAsF_6$ in 50:50, by volume, mixture of PC/DME. For a $Li/CF_x$ cell, the preferred electrolyte is 1.0M to 1.4M $LiBF_4$ in γ-butyrolactone (GBL).

For a lithium ion cell, such as of a carbonaceous anode and a $LiCoO_2$ or $LiFePO_4$ cathode, a preferred electrolyte comprises a solvent mixture of EC:DMC:EMC:DEC having a lithium salt dissolved therein. Most preferred molar percentages for the various carbonate solvents include EC in the range of about 10% to about 50%; DMC in the range of about 5% to about 75%; EMC in the range of about 5% to about 50%; and DEC in the range of about 3% to about 45%. However, in formulating a quaternary mixed solvent system for an electrolyte activating a lithium ion cell, it is important that DMC, EMC and DEC are essentially at an equilibrium molar condition from the beginning so that the electrolyte does not undergo significant chemical decomposition during cell cycling. This is further described in U.S. Pat. No. 6,746,804 to Gan et al. This patent is assigned to the assignee of the present invention and incorporated herein by reference.

When the mechanical structure or configuration of the cell requires, a separator is employed to provide physical separation between the anode and the cathode current collector for the oxyhalide cell and between the anode and the cathode in a solid positive electrode cell, whether of a primary or secondary chemistry. The separator is of electrically insulative material, and the separator material also is chemically unreactive with the counter electrode materials and both chemically unreactive with and insoluble in the catholyte or the electrolyte, as the case may be. In addition, the separator material has a degree of porosity sufficient to allow flow there through of the catholyte or the electrolyte during the electrochemical reaction of the cell.

Illustrative separator materials include woven and non-woven fabrics of polyolefinic fibers or fluoropolymeric fibers including polyvinylidene fluoride, polyethylenetetrafluoroethylene, and polyethylenechlorotrifluoroethylene laminated or superposed with a polyolefinic or a fluoropolymeric microporous film. Suitable microporous films include a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.). The separator may also be composed of non-woven glass, glass fiber materials and ceramic materials.

The form of the separator typically is a sheet which is placed between the anode and the cathode current collector or between the negative and the positive electrodes, and in a manner preventing physical contact there between. Such is the case when the anode is folded in a serpentine-like structure with a plurality of cathode current collector plates or positive electrode plates disposed intermediate the anode folds and received in a cell casing or when the electrode combination is rolled or otherwise formed into a cylindrical "jellyroll" configuration.

The assembly of the cell described herein is preferably in the form of a wound element cell. That is, the fabricated cathode current collector or positive electrode, the anode or negative electrode and the separator are wound together in a "jellyroll" type configuration or "wound element cell stack" such that the anode or negative electrode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The cathode current collector or positive terminal pin feedthrough preferably comprises titanium although molybdenum, aluminum, nickel alloy, or stainless steel can also be used. The cell header comprises elements having compatibility with the other components of the electrochemical cell and is resistant to corrosion. The cathode current collector or positive electrode lead is welded to the positive terminal pin in the glass-to-metal seal and the header is welded to the case containing the electrode stack. The cell is thereafter filled with the catholyte or electrolyte solution described hereinabove and hermetically sealed such as by close-welding a stainless steel ball over the fill hole, but not limited thereto.

The above assembly describes a case-negative cell, which is the preferred construction of the exemplary cell chemistries of the present invention. As is well known to those skilled in the art, the exemplary electrochemical systems can also be constructed in case-positive configurations.

The lithium ion cell of the present hybrid power system preferably has an open circuit voltage when fully charged that is in the range from 1.0 V to 4.5 V. However, it will be readily apparent to those of ordinary skill in the art that an appropriate pair of positive and negative electrodes for the lithium ion cell can be chosen to provide a cell voltage when the cell is in a fully charged state that is equal to or lower than the open circuit voltage of the primary cell with which the secondary cell is coupled. Preferably, the open circuit voltage of the lithium ion cell is from about 0.05 volts to about 0.8 volts and, most preferably, from about 0.1 volts to about 0.6 volts, less than the open circuit voltage of the freshly built lithium oxyhalide cell. The preferred lithium ion chemistry comprises a carbonaceous anode coupled to a lithiated iron phosphate cathode.

Connecting a secondary lithium ion cell in parallel with a primary lithium cell, particularly a lithium oxyhalide cell, has several advantages. First, the hybrid power system exhibits increased rate capability for delivering higher power pulses than the primary cell alone. Secondly, because the secondary cell assists in handling the higher power loads, the primary cell is capable of delivering its capacity more efficiently, leading to a greater capacity overall for the system. Thirdly, the secondary cell is capable of delivering power almost instantaneously when a load is applied, thus eliminating the large voltage drop (voltage delay) that commonly occurs when the primary cell is discharged alone.

Lastly, the present power system exhibits improved safety. Connecting the secondary cell in parallel with the primary cell makes it possible to use a primary cell with lower rate capability than would otherwise be required. The overall power source is thus fundamentally safer because this arrangement eliminates the need for a high rate primary cell, which can potentially be hazardous to handle.

In an alternate embodiment, an electrical element such as a diode or an electrical circuit that steps down voltage is incorporated into the circuit for the present hybrid power system. The purpose of the electrical element or circuit is to decrease or eliminate exposure of the secondary cell to a voltage from the primary cell that is higher than the fully charged open circuit voltage of the secondary cell.

FIG. 1 is a schematic of an exemplary power system 10 according to the present invention. The power system 10 comprises a primary lithium cell 12 electrically connected in parallel with a secondary, lithium ion cell 14. Opposed leads 16 and 18 are connected to the circuit between the primary and secondary cells 12, 14. The leads 16, 18 are connectable to a load as a power source. While not necessary, a diode 20 is provided in the circuit intermediate the primary cell 12 and the lead 16.

For example, if the voltage drop across the diode 20 is about 0.5 volts, the secondary cell 14 is only exposed to 3.17 volts calculated as 3.67 volts (the open circuit voltage of the cell 12) minus 0.5 volts. This is well below the 3.6 volt open circuit voltage of the lithium ion cell 14. In an application where the secondary cell 14 could be harmed by exposure to a voltage that is significantly higher than its open circuit voltage in a fully-charged state, the diode 20 prevents the secondary cell 14 from being exposed to the higher voltage, and therefore extends its useful life. Use of the diode 20 or another electrical element or circuit also makes it possible to build hybrid power sources using secondary cells with an open circuit voltage of 3.6 V when fully charged in parallel with a lithium/sulfuryl chloride cell or a fresh bromine-chlorine complex thionyl chloride cell, both of which have an open circuit voltage of about 3.9 volts, or other primary cells with mixed electrolytes.

Since the voltage drop for different diodes varies from 0.1 volts to 0.7 volts, it is possible through the use of different diodes or other components to fine-tune the hybrid power source for a particular application, or to allow different cell types to be used for optimal performance.

The following examples describe the manner and process of an electrochemical system according to the present invention, and set forth the best mode contemplated by the inventors of carrying out the invention, but are not to be construed as limiting.

EXAMPLE I

In order to demonstrate the advantages attributed to the present invention of a lithium ion cell connected in parallel with a lithium/oxyhalide cell, several tests were performed. In the first test, a lithium/BCX cell, having an open circuit voltage of about 3.9 volts in a freshly built state, was pulse discharged without the benefit of being connected to a lithium ion cell. Specifically, a Li/BCX (bromine chlorine complex thionyl chloride) primary cell of a sub-CC size (21 mm diameter, 100 mm length) was pre-discharged by 5 Ah. This cell was then placed in an environmental chamber and held at 60° C. A pulse sequence of consisting of 150 mA for 9 seconds and 3.3 W for 1.5 seconds was applied once every two hours.

Figure 2:
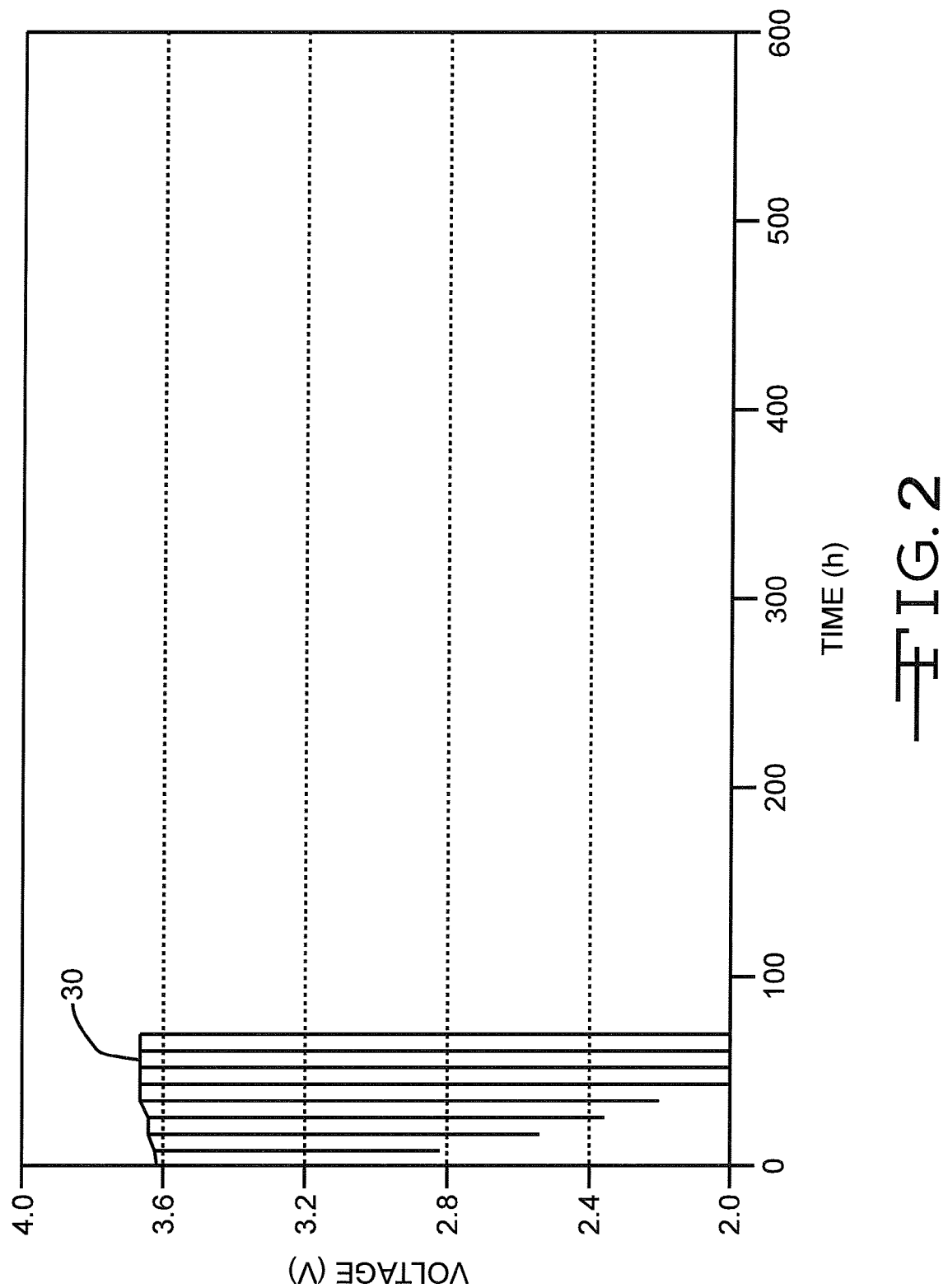
FIG. 2 is a graph constructed from the pulse discharge results of an exemplary primary lithium oxyhalide cell.

The graph illustrated in FIG. 2 was constructed from the pulse discharge results. Numerical designation 30 indicates the open circuit voltage upon removing the pulse application from the cell. As is readily apparent, the open circuit voltage during pulsing immediately fell below 3.0 volts and continued dropping rapidly as the test continued.

EXAMPLE II

A similarly built Li/BCX cell as used in Example I to construct FIG. 2 was connected in parallel to a lithium ion cell. In particular, the cell had an open circuit voltage of about 3.9 volts in a freshly built state. The secondary cell was rated at 600 mAh and comprised a graphite anode coupled to a LiFePO$_4$ cathode. This cell had an open circuit voltage in a fully charged state of about 3.6 volts. Such cells are commercially available from K2 Energy Solutions under model LFP123A.

Figure 3:
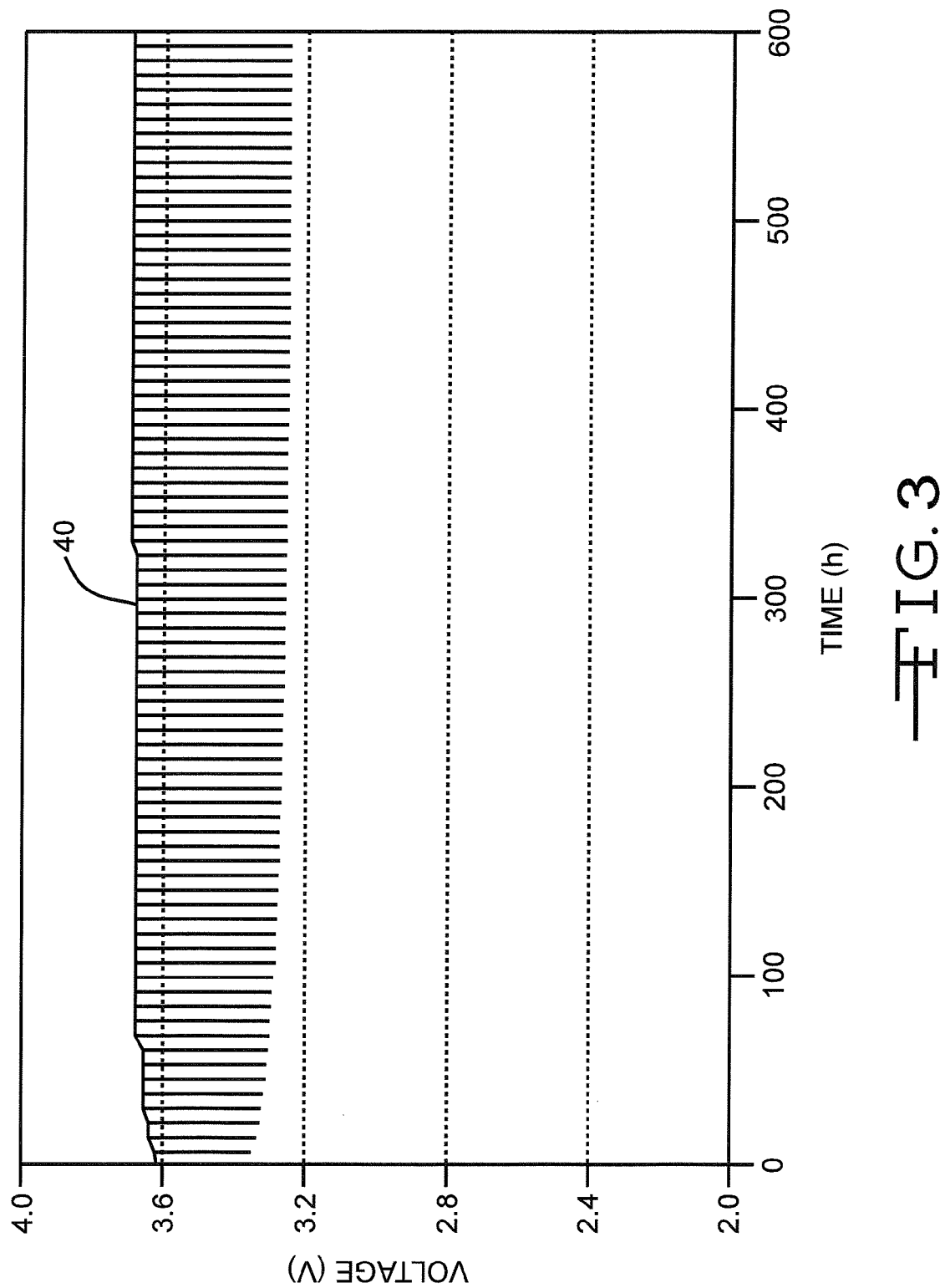
FIG. 3 is a graph constructed from the pulse discharge results of a similar primary lithium oxyhalide cell as was used to construct the graph of FIG. 2, but with the cell being electrically connected in parallel to a lithium ion cell.

In a similar manner as in Example I, this electrochemical cell system was pre-discharged by 5 Ah followed by storage in an environmental chamber at 60° C. A pulse sequence consisting of 150 mA for 9 seconds and 3.3 W for 1.5 seconds was applied once every two hours. The graph illustrated in FIG. 3 was constructed from the pulse discharge results. Numerical designation 40 indicates the open circuit voltage upon removing the pulse application from this hybrid cell system. As the graph illustrates, the voltage of the hybrid power system remained well above 3.2 volts during the pulsing protocol for several weeks.

Thus, it is apparent that connecting a higher rate lithium ion cell in parallel with a lithium primary cell provides a novel hybrid power source. The hybrid power source has both a high specific energy and a much improved capability for delivering high power pulses, even after long periods of storage. While a preferred lithium primary cell is a lithium/oxyhalide system, particularly a Li/BCX cell, and the preferred lithium ion cell is of a carbonaceous anode/LiFePO$_4$ cathode, the present invention should not be so limited. Instead, any of the primary and secondary systems described above can be electrically connected in parallel to provide the present invention as long as the open circuit voltage of the primary cell in a freshly built state is equal to or greater than the open circuit voltage of the lithium ion cell in a fully charged state. Furthermore, the open circuit voltage of the lithium ion cell in the fully charged state is from about 0.05 volts to about 0.8 volts less than the open circuit voltage of the freshly built primary cell.

It is appreciated that various modifications to the inventive concepts described herein may be apparent to those skilled in the art without departing from the spirit and scope of the present invention as defined by the hereinafter appended claims.

What is claimed is:

1. An electrochemical power system, which consists of:
   a) a first primary cell comprising:
      i) a first casing;
      ii) an anode comprising lithium;
      iii) a cathode current collector; and
      iv) a catholyte comprising an inorganic depolarizer solvent provided with a halogen or an interhalogen dissolved therein to activate the anode and cathode current collector housed inside the first casing;
   b) a second lithium ion cell comprising:
      i) a second casing;
      ii) a negative electrode of an anode material that intercalates and deintercalates with lithium and is contacted to an anode current collector;
      iii) a positive electrode comprising a cathode active material that intercalates and deintercalates with lithium and that is contacted to a cathode current collector; and
      iv) an electrolyte activating the negative and positive electrodes of the second rechargeable cell, housed inside the second casing; and
   c) wherein the first and second cells are electrically connected in parallel, and
   d) wherein a first open circuit voltage of the first primary cell in a freshly built state is greater than a second open circuit voltage of the second lithium ion cell in a fully charged state.

2. The electrochemical power system of claim 1 wherein the second open circuit voltage of the lithium ion cell in the fully charged state is from about 1.0 volts to about 4.5 volts.

3. The electrochemical power system of claim 1 wherein the second open circuit voltage of the lithium ion cell in the fully charged state is from about 0.05 volts to about 0.8 volts less than the first open circuit voltage of the freshly built first primary cell.

4. The electrochemical power system of claim 1 wherein the interhalogen of the first cell is selected from the group consisting of ClF, ClF$_3$, ICL, ICl$_3$, IBr, IF$_3$, IF$_5$, BrCl, BrF, BrF$_3$, BrF$_5$, and mixtures thereof.

5. The electrochemical power system of claim 1 wherein the halogen of the first cell is selected from the group consisting of iodine, bromine, chlorine, fluorine, and mixtures thereof.

6. The electrochemical power system of claim 1 wherein the inorganic solvent of the first cell is selected from the group consisting of thionyl chloride, sulfuryl chloride, selenium oxychloride, chromyl. chloride, phosphoryl chloride, phosphorous sulfur trichloride, and mixtures thereof.

7. The electrochemical power system of claim 1 wherein the cathode current collector of the first cell is a carbonaceos material.

8. The electrochemical power system of claim 1 wherein the cathode current collector of the first cell is selected from the group consisting of graphite, coke, acetylene black, carbon black, glassy carbon, pitch carbon, synthetic carbon, mesocarbon microbeads (MCMB), carbon monofluoride, and mixtures thereof, contacted to a metal substrate.

9. The electrochemical power system of claim 1 wherein the catholyte of the first cell includes at least one salt selected from the group consisting of LiCl, LiBr, LiPF$_6$, LiBF$_4$, LiAsF$_6$, LiSbF$_6$, LiClO$_4$, LiAlCl$_4$, LiGaCl$_4$, LiC(SO$_2$CF$_3$)$_3$, LiN(SO$_2$CF$_3$)$_2$, LiSCN, LiO$_3$SCF$_2$CF$_3$, LiC$_6$F$_5$SO$_3$, LiO$_2$, LiO$_2$CCF$_3$, LiSO$_3$F, LiB(C$_6$H$_5$)$_4$, LiCF$_3$SO$_3$, and mixtures thereof.

10. The electrochemical power system of claim 1 wherein the anode material of the negative electrode for the lithium ion cell is selected from the group consisting of coke, carbon black, graphite, acetylene black, carbon fibers, glassy carbon, and mixtures thereof.

11. The electrochemical power system of claim 1 wherein the cathode active material of the lithium ion cell is selected from the group consisting of lithiated oxides, lithiated sulfides, lithiated selenides, and lithiated tellurides of the group selected from vanadium, titanium, chromium, copper, molybdenum, niobium, iron, nickel, cobalt, manganese, and mixtures thereof.

12. The electrochemical power system of claim 1 wherein the cathode active material of the lithium ion cell is selected from the group consisting of LiNiO$_2$, LiMn$_2$O$_4$, LiCoO$_2$, LiCo$_{0.92}$Sn$_{0.08}$O$_2$, LiCO$_{1-x}$Ni$_x$O$_2$, LiNi$_x$Co$_y$Mn$_z$O$_2$, LiNi$_{1-x}$Al$_x$O$_2$, LiMn$_{1-x}$Al$_x$O$_2$, LiFePO$_4$, and mixtures thereof.

13. The electrochemical power system of claim 1 wherein the electrolyte for the lithium ion cell comprises at least one relatively low viscosity solvent selected from the group consisting of tetrahydrofuran, methyl acetate, diglyme, trigylme, tetragylme, dimethyl carbonate, ethyl methyl carbonate, 1,2-dimethoxyethane, diisopropylether, 1,2-diethoxyethane, 1-ethoxy, 2-methoxyethane, dipropyl carbonate, ethyl methyl carbonate, methyl propyl carbonate, ethyl propyl carbonate, diethyl carbonate, and at least one relatively high permittivity solvent selected from the group consisting of propylene carbonate, ethylene carbonate, butylene carbonate, acetonitrile, dimethyl sulfoxide, dimethyl formamide, dimethyl acetamide, γ-butyrolactone, γ-valerolactone, N-methyl-pyrrolidinone.

14. The electrochemical power system of claim 1 wherein the electrolyte of the second cell includes at least one salt selected from the group consisting of LiCl, LiBr, LiPF$_6$, LiBF$_4$, LiAsF$_6$, LiSbF$_6$, LiClO$_4$, LiAlCl$_4$, LiGaCl$_4$, LiC(SO$_2$CF$_3$)$_3$, LiN(SO$_2$CF$_3$)$_2$, LiSCN, LiO$_3$SCF$_2$CF$_3$, LiC$_6$F$_5$SO$_3$, LiO$_2$, LiO$_2$CCF$_3$, LiSO$_3$F, LiB(C$_6$H$_5$)$_4$, LiCF$_3$SO$_3$, and mixtures thereof.

15. The electrochemical power system of claim 1 wherein the first and second cells each include a separator to prevent direct physical contact between the opposite polarity electrodes.

16. The electrochemical power system of claim 1 wherein a diode is electrically connected in series between the first primary cell and the second lithium ion cell.

17. The electrochemical power system of claim 1 wherein a voltage drop across a diode electrically connected in series between the first primary cell and the second lithium ion cell ranges from about 0.1 volts to about 0.7 volts 18. An electrochemical power system, which consists of:
   a) a first primary cell comprising a Li/BCX couple;
   b) a second lithium ion cell comprising a carbonaceous anode electrochemically coupled with a cathode of LiFePO$_4$; and
   c) wherein the first and second cells are electrically connected in parallel, and d) wherein a first open circuit voltage of the first primary cell in a freshly built state is greater than a second open circuit voltage of the second. lithium ion cell in a fully charged state.

19. The electrochemical power system of claim 18 wherein the second open circuit voltage of the lithium ion cell in the fully charged state is from about 1.0 volts to about 4.5 volts.

20. The electrochemical power system of claim 18 wherein the second open circuit voltage of the lithium ion cell in the fully charged state is from about 0.05 volts to about 0.8 volts less than the first open circuit voltage of the freshly built first primary cell.

21. The electrochemical power system of claim 18 wherein a diode is electrically connected in series between the first primary cell and the second lithium ion cell.

22. A method for providing an electrochemical power system, consisting of the steps of:
   a) providing a lithium/oxyhalide cell;
   b) providing a lithium ion cell;
   c) electrically connecting the lithium/oxyhalide cell to the lithium ion cell in parallel,
   d) wherein a first open circuit voltage of the lithium/oxyhalide cell in a freshly built, state is greater than a second open circuit voltage of the lithium ion cell in a fully charged state.

23. The method of claim 22 including providing the second open circuit voltage of the lithium ion cell in the fully charged state being from about 0.05 volts to about 0.8 volts less than the first open circuit voltage of the freshly built lithium/oxyhalide cell.

24. The method of claim 22 including electrically connecting a diode in series between the lithium/oxyhalide cell and the lithium ion cell.

* * * * *